United States Patent
Werner

(10) Patent No.: US 8,462,857 B2
(45) Date of Patent: Jun. 11, 2013

(54) METHOD AND RECEIVER FOR DECODING DIGITAL INFORMATION

(75) Inventor: Christoph Werner, Grafing (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 196 days.

(21) Appl. No.: 12/656,281

(22) Filed: Jan. 22, 2010

(65) Prior Publication Data

US 2010/0226445 A1   Sep. 9, 2010

Related U.S. Application Data

(63) Continuation of application No. PCT/EP2008/053380, filed on Mar. 20, 2008.

(30) Foreign Application Priority Data

Mar. 23, 2007 (EP) .................................. 07006101

(51) Int. Cl.
*H04B 14/06* (2006.01)

(52) U.S. Cl.
USPC ............. 375/246; 375/244; 375/340; 341/59; 341/76; 341/94; 341/101

(58) Field of Classification Search
USPC ................. 375/219, 220, 222, 244, 246, 257, 375/371–376; 341/101
See application file for complete search history.

(56) References Cited

U.S. PATENT DOCUMENTS

| 7,054,374 B1 * | 5/2006 | Jensen et al. ................... 375/257 |
| 2003/0030576 A1 * | 2/2003 | Pitio et al. ...................... 341/101 |
| 2006/0274873 A1 * | 12/2006 | Abramovitch ................ 375/360 |

FOREIGN PATENT DOCUMENTS

| EP | 0 817 399 A2 | 1/1998 |
| WO | 98/49852 | 11/1998 |
| WO | 00/41521 | 7/2000 |

OTHER PUBLICATIONS

Claes, Glenn, Andre Goffin, Bart Scheers and Patrick Verlinde. "Using turbocodes on optical links" Journal of Systematics, Cybermatics and Informatics. vol. 4, No. 2, pp. 80-84.*
Chase, D.; , "Class of algorithms for decoding block codes with channel measurement information," Information Theory, IEEE Transactions on, vol. 18, No. 1, pp. 170-182, Jan. 1972.*
International Search Report for Application No. PCT/EP2008/053380; mailed Jul. 18, 2008.
D. Chase, "A Class of Algorithms for Decoding Block Codes with Channel Measurement Information", IEEE Transactions on Information Theory, vol. 18, No. 1, Jan. 1972, pp. 170-182.

* cited by examiner

*Primary Examiner* — Daniel Washburn
*Assistant Examiner* — Eboni Hughes
(74) *Attorney, Agent, or Firm* — Staas & Halsey LLP

(57) ABSTRACT

In a method for decoding digital information, a bit-stream signal comprising binary information is received at a digital receiver utilizing wired communication. The received bit-stream signal is sampled for each binary value at least two different sampling points within an eye pattern associated with the related binary value in order to obtain a hard-bit value for each sampling point. A single soft-bit value for each binary value based on the hard-bit values of the relevant binary value is generated and the bit value of the binary value is determined by subjecting the soft-bit values to a soft-decision algorithm.

16 Claims, 7 Drawing Sheets

| b1 | b2 | r |
|---|---|---|
| 0 | 0 | −1.0 |
| 0 | 1 | 0.0 |
| 1 | 0 | 0.0 |
| 1 | 1 | +1.0 |

FIG. 5

|  | S1 | S2 | S3 | S4 | S5 | S6 | r |
|---|---|---|---|---|---|---|---|
| OFFSET | −100mV | 0mV | +100mV | −100mV | 0mV | +100mV |  |
|  | 0 | 0 | 0 | 0 | 0 | 0 | −1.0 |
|  | 1 | 0 | 0 | 0 | 0 | 0 | −0.7 |
|  | 0 | 0 | 0 | 1 | 0 | 0 | −0.7 |
|  | 1 | 0 | 0 | 1 | 0 | 0 | −0.3 |
|  | 1 | 1 | 0 | 0 | 0 | 0 | −0.3 |
|  | 0 | 0 | 0 | 1 | 1 | 0 | −0.3 |
|  | 0 | 0 | 0 | 1 | 1 | 1 | 0.0 |
|  | 1 | 0 | 0 | 1 | 1 | 0 | 0.0 |
|  | 1 | 1 | 1 | 0 | 0 | 0 | 0.0 |
|  | 1 | 1 | 0 | 1 | 0 | 0 | 0.0 |
|  | 1 | 1 | 0 | 1 | 1 | 0 | 0.3 |
|  | 1 | 1 | 1 | 1 | 0 | 0 | 0.3 |
|  | 1 | 0 | 0 | 1 | 1 | 1 | 0.3 |
|  | 1 | 1 | 1 | 1 | 1 | 0 | 0.7 |
|  | 1 | 1 | 0 | 1 | 1 | 1 | 0.7 |
|  | 1 | 1 | 1 | 1 | 1 | 1 | 1.0 |

FIG. 7

METHOD AND RECEIVER FOR DECODING DIGITAL INFORMATION

CROSS REFERENCE TO RELATED APPLICATIONS

This application is a continuation of International Application No. PCT/EP2008/053380, filed Mar. 20, 2008, and claims the benefit thereof. The International Application claims the benefit of European Application No. 07006101.5 filed on Mar. 23, 2007, both applications are incorporated by reference herein in their entirety.

BACKGROUND

Described below are a method and a receiver for decoding digital information which is transmitted utilizing wired communication.

8B/10B coding schemes, as an example of so-called MRL Coding (Maximum Run Length Coding), are the basis for many high speed serial protocols and standards, such as CPRI, 1000Base-X, Fiber Channel, InfiniBand, 10GBASE-X, 10GFC, XAUI, and Serial Rapid 10, used for wired communication. 8B/10B coding schemes are relatively popular, because they provide, besides the data transmission as such, embedded clocking and control information. Applications of 8B/10B may include SERDES devices for communication applications, backplane transceivers within Internet switches and routers, and chip-to-chip communication.

The data rates of such wired data communication are likely to increase, potentially compromising the quality of the signals to be received caused, for instance, by cross-talk and line losses. This may increase the bit error rate at the receiving end of a related communication system.

8B/10B coding schemes may provide for error detection within received data packets. 8B/10B coding schemes, however, do normally not provide error correction of such data packets.

In order to achieve error correction, additional redundant bits may be transmitted or data that have been received in error may be transmitted again. This, however, results in an increasing number of overhead bits.

Published European application for patent No. 1 351 462 A1 discloses applying additional error correction during transmission of 8B/10B pattern without increasing the number of overhead bits. An additional "coding layer" is added, wherein the 8B/10B encoded data go through a low latency encoding process during transmission and are regenerated by a complementary low latency decoding process during the receive process. Consequently, appropriate transmitters and receivers are needed, complicating interoperability with known devices. Furthermore, the additional "coding layer" may complicate clock recovery at the receiver.

SUMMARY

It is an aspect of the method to provide an error correction of digital information received at a digital receiver and utilizing wired communication, without modifying the coding scheme used for transmitting the digital information.

Another aspect is to provide a corresponding digital receiver.

These aspects are achieved by a method for decoding digital information, including:
receiving, utilizing wired communication, at a digital receiver a bit-stream signal which includes binary information,
sampling the received bit-stream signal for each binary value at at least two different sampling points within an eye pattern associated with the related binary value to obtain a hard-bit value for each sampling point,
generating a single soft-bit value for each binary value based on the hard-bit values of the relevant binary value, and
determining the bit value of the binary value by subjecting the soft-bit values to a soft-decision algorithm.

The method may further comprise recovering a clock signal for sampling the bit-stream signal from the bit-stream signal.

These aspects are also achieved by a digital receiver for decoding digital information, having:
a clock recovery device for generating a clock signal, wherein the clock recovery device is configured to generate the clock signal utilizing a bit-stream signal which is received by the digital receiver utilizing wired communication and which comprises binary information,
a level detection device for sampling the received bit-stream signal for each binary value at at least two different sampling points within an eye pattern associated with the related binary value utilizing at least indirectly the clock signal in order to obtain a hard-bit value for each sampling point, and
a calculation device configured to generate a single soft-bit value for each binary value based on the hard-bit values of the relevant binary value and to determine the bit value of the binary value by subjecting the soft-bit values to a soft-decision algorithm.

According to the method, the received bit-stream signal is received utilizing wire bound technology and may particularly be applied for SERDES devices for communication applications, backplane transceivers within Internet switches and routers, and chip-to-chip communication. The bit-stream signal has binary information and each binary information (bit) has a pulse duration. Due to distortion during the transmission, the bit-stream signal is normally not ideally pulse-shaped when reaching the digital receiver.

In order to recover the binary information at the receiver, i.e. to recover the bit value (logical "0" or logical "1") for each binary value transmitted, the received bit-stream signal is sampled for each binary value at at least two different sampling points within an eye pattern associated with the related binary value. An eye pattern is also known as an eye diagram and represents an oscilloscope display in which the bit-stream signal is repetitively sampled and applied to a vertical input of the oscilloscope while the data rate is used to trigger the horizontal sweep. The eye pattern is so called because the pattern looks like a series of eyes between a pair of rails.

"Sampling at a point within the eye pattern" in this context means to sample the bit-stream signal at a point in time and to compare the sampled signal with a level. If the bit-stream signal is a voltage signal, then this level is a voltage level not necessarily being 0V. If the sampled signal is less than the level, then, depending on the convention used, the hard-bit value is one of the two states possible and if the sampled signal is greater than the level, then the hard-bit value is the other of the two possible states. For example, if the sampled signal is less than the level, then the hard-bit value is logical "0", and if the sampled signal is greater than the level, then the hard-bit value is logical "1".

The two different sampling points within the eye pattern may, therefore, be realized by sampling the bit-stream signal at two different points in time within the eye pattern in order to obtain sampled bit-stream signals and comparing the sampled bit-stream signals with the same level, sampling the bit-stream signal at a single point in time within the eye pattern in order to obtain a sampled bit-stream signal and comparing the sampled bit-stream signal with two different levels, or sampling the bit-stream signal at two different points in time within the eye pattern in order to obtain sampled bit-stream signals and comparing the sampled bit-stream signals with two different levels.

In one embodiment of the digital receiver, the level detection device comprises a plurality of sampling devices, each generating one of the hard-bit values related to each binary values by sampling the bit-stream signal at the relevant point in time and by comparing the sampled bit-stream signal with the relevant level. The sampling devices may be flips-flops, particularly D-type flip-flops.

Instead of only obtaining a single hard-bit value for each binary value, at least two hard-bit values are obtained using the different sampling points within the eye pattern. The hard-bit values for each binary value are then used for generating the soft-bit value. In general, the soft-bit value is a real number and is used for obtaining the bit value of the relevant binary value utilizing a soft-decision algorithm.

The soft-bit value may be pre-defined and stored in a table. The soft-bit values may be, for instance, determined by taking the average of the different hard-bit values associated with a binary value.

Soft-decision algorithms per se are known in the art. Examples of suitable soft-decision algorithms include the so-called CHASE-1, CHASE-2 or CHASE-3 soft-decision algorithms as disclosed, for instance, in T. K. Moon, "Error correction coding", Wiley, 2005, pg. 445.

For the soft-decision algorithm it may be necessary to generate a reliability value based on the soft-bit values for the individual binary values.

In one embodiment of the method or the receiver, the soft-decision algorithm includes error correction ability. Then, not only an error in the received bit-stream signal can be detected, but can also be corrected automatically. Suitable soft-decision algorithms having error correction ability include the aforementioned CHASE-1, CHASE-2 or CHASE-3 soft-decision algorithms.

The bit-stream signal may particularly be encoded utilizing a Maximum Run Length Coding scheme combined with a DC-balanced block coding scheme and may especially be a 8B/10B coding scheme.

In general, a block-code is a line-code in which the encoded block is comprised of N symbols comprising K information (K<N) and N−K redundant check symbols.

For the 8B/10B coding scheme, 8 bits of data are transmitted as a 10-bit entity (10-bit symbol). The low five bits of data are encoded into a 6-bit group and the top three bits are encoded into a 4-bit group.

DC Balanced coding in general means that the overall number of logical "0" values in the encoded serial bit stream equals at least approximately the overall number of logical "1" values for all cases of uncoded data to be sent.

DC Balancing can be accomplished, for instance, by keeping track of the data sent and by counting the number of logical "1" that were sent. Before sending the next set of data, the number of logical "1" are checked again. If the count of logical "1" values is increasing, then the data is modified (inverted), resulting in a decreasing running logical "1" count. The net effect of this is to keep the charge on the line within a certain bound.

Then, the receiver may need to do two functions, firstly it must still recover the data and it must also detect if the data has been modified. If modified data is detected, then it needs to correct for it. A simple and efficient way to do this is to assign a data bit to indicate if the "data" was modified or not. With this, the receiver simply monitors that special bit, and decodes the data if it has been modified to maintain balance on the line. DC Balancing may particularly be useful with serialized data streams.

In the 8B/10B coding scheme, DC Balancing may be accomplished by selecting only those 10B symbols as allowed code words that have either the same number of logical "0" and logical "1" values (5:5) or have two more logical "0" values than logical "1" values (6:4). Moreover, the current "running disparity value" RD is traced during encoding so that it is possible to keep track whether the aforementioned condition is satisfied. For an unequal case (negative running disparity) the next 10 bit data word is inverted so that there are less logical "0" values than logical "1" values. That will balance the overall sum over the last 10 bit symbols again.

MRL Coding in general means that the bit value of the bit-stream must change within a maximum number of consecutively transmitted bits. For 8B/10B codes the run length is four.

If the bit-stream signal is encoded utilizing the Maximum Run Length Coding scheme combined with a DC-balanced block coding scheme, then the bit-stream signal may comprise sequentially received blocks of a plurality of binary values. Then for each block soft-bit sequences may be generated, wherein the soft-bit sequences comprise a sequence of the soft-bit values associated with the binary values of the relevant block, and the bit value of the binary value may be determined by subjecting the soft-bit sequences to the soft-decision algorithm.

In a further embodiment of the method or the receiver, the different sampling points within the eye pattern may be varied while receiving the bit-stream signal. The variation may include varying the relevant level with which the sampled bit-stream signal is sampled and/or the point in time at which the bit-stream signal is sampled.

The variation may particularly include determining the vertical opening of the eye pattern and determining the points within the eye pattern for the sampling of the bit-stream signal by adjusting a level, with which a sampled bit-stream signal is compared, in accordance with the vertical opening of the eye pattern.

It may, for instance, be possible to adapt the points in time, when the bit-stream signal is sampled, and/or the levels, with which the sampled signal is compare, during time. For example, it is possible to determine the vertical eye opening and/or the width of the eye pattern. Then, the points in time can be distributed around reference point in time corresponding, for instance, to the middle of the eye pattern.

While the bit-stream signal is received, these points in time may adapted, for instance, in accordance to the integrity of the bit-stream signal.

Alternatively or additionally, the levels may initially set to an initial level. While receiving the bit-stream signal, the levels can be adapted, for instance, in accordance to the integrity of the bit-stream signal.

If, for instance, three sampling points within the eye pattern is used, a first sampling point can be set to a point in time corresponding to the middle of the eye pattern. The other two sampling points may be set to points in time being before and after the first point in time.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 5 is a table,
FIG. 6 is a block diagram of another level detection device and
FIG. 7 is a further table.

DETAILED DESCRIPTION OF THE PREFERRED EMBODIMENT

Figure 1:
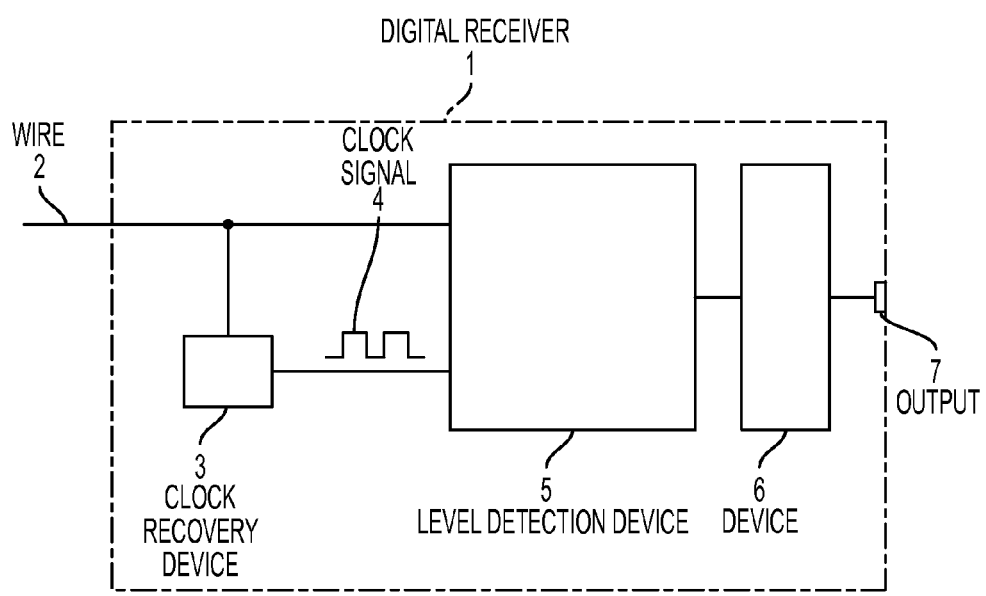
FIG. 1 is a block diagram of a digital receiver.

Reference will now be made in detail to the preferred embodiments, examples of which are illustrated in the accompanying drawings, wherein like reference numerals refer to like elements throughout.

Figure 2:
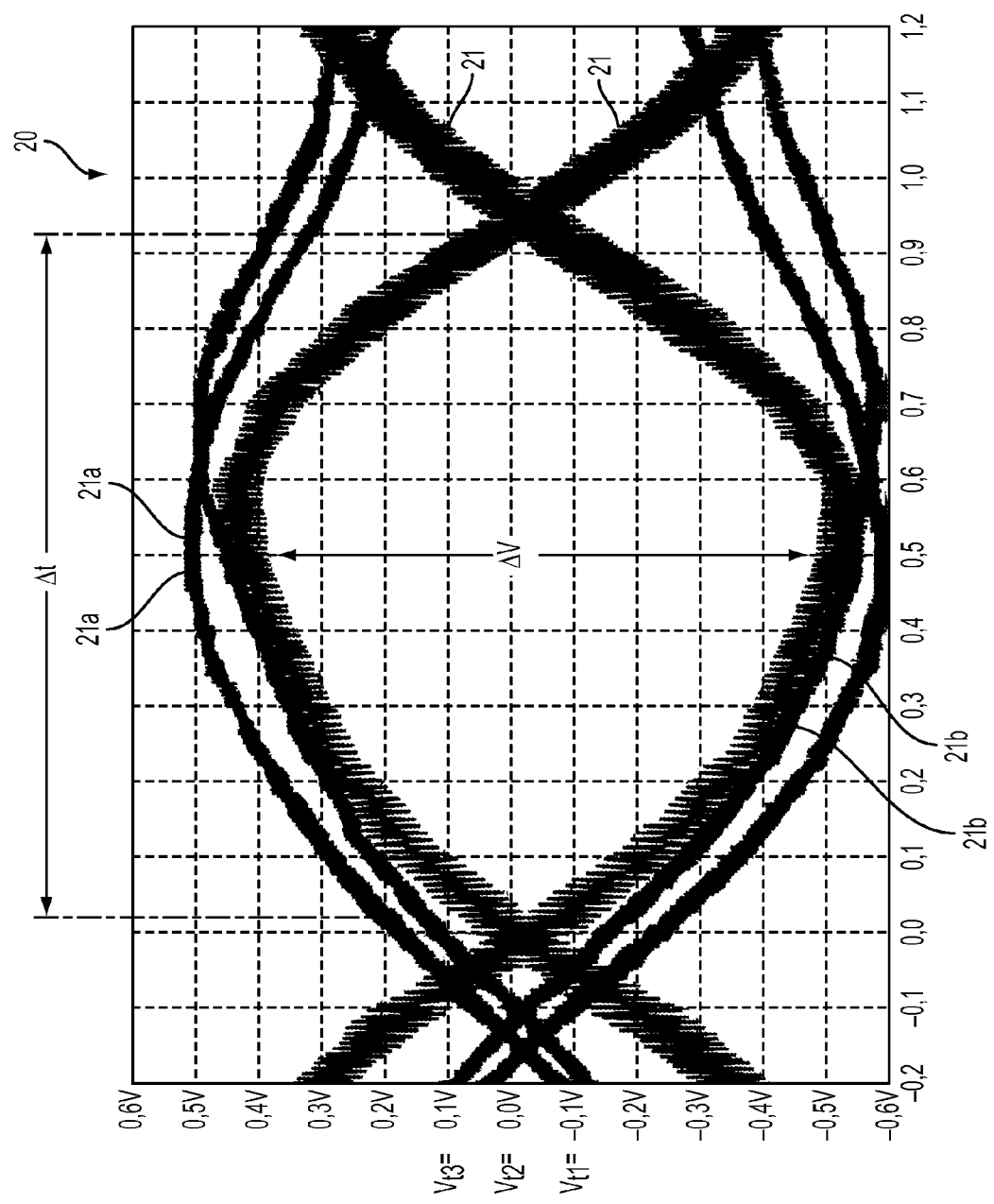
FIG. 2 is a graph of an eye pattern.

FIG. 1 shows a digital receiver 1 for receiving a bit-stream signal 21 sent via a wire 2 connected to the receiver 1. The bit-stream signal 21 comprises digital (binary) information encoded utilizing an 8B/10B encoding scheme as an example of an Maximum Run Length Coding scheme (MRL) combined with a DC-balanced block coding scheme and is shown in FIG. 2. The bit-stream signal 21 has a certain data rate of, for instance, 1.22 Gbit/s. Further examples of Maximum Run Length Coding scheme combined with a DC-balanced block coding scheme are 64B/66B and 5B/6B codes. For the exemplary embodiment, the wire 2 is a wire-pair and the bit-stream signal 21 is represented by a voltage difference between the lines of the wire-pair.

FIG. 2 shows several bit-stream signals 21 forming an eye pattern 20 which is also referred to as an eye diagram. Generally, an eye pattern is an oscilloscope display in which a the bit-stream signal 21 is repetitively sampled and applied to an vertical input of the oscilloscope, while the data rate of the bit-stream signal 21 is used to trigger the horizontal sweep.

The bit-stream signal 21 has an amplitude which is approximately 500 mV for the exemplary embodiment. Due to distortion caused, for instance, by line-losses or cross-talk, the bit-stream signal 21 is distorted and does not have the form of an ideal square wave. Bit-stream signals 21a of the bit-stream signals 21 correspond to logical "1" for the shown eye pattern 20 and bit-stream signals 21b correspond to logical "0".

In general, a block-code is a line-code in which the encoded block is comprised of N symbols comprising K information (K<N) and N−K redundant check symbols. An 8B/10B coding schemes as described in the IEEE Standard 802.3-2002, chapter 36.2.4 "8B/10B transmission code", maps 8-bit symbols to 10-bit symbols to achieve DC-balance and disparity, and allows clock recovery. 8 bits of data are transmitted as a 10-bit entity. The low five bits of data are encoded into a 6-bit group and the top three bits are encoded into a 4-bit group. The two bit groups a grouped together to form a one 10-bit symbol that is transmitted on a wire 2.

MRL Coding in general means that the bit value of the bit-stream must change within a maximum number of consecutively transmitted bits. For 8B/10B codes the run length is four.

The receiver 1 comprises a clock recovery device 3 which generates a clock signal 4 used for decoding the digital information encoded in the bit-stream signal 21. Since the 8B/10B encoding scheme includes clock recovery functionality, the clock recovery device 3 can recover the clock signal 4 from the bit-stream signal 21. Clock recovery devices per se are well known in the relevant art and may include PLL (Phase Locked Loop) circuits. Therefore, the clock recovery device 3 is not described in detail.

Since the bit-stream signal 21 has a bit rate of 1.22 Gbit/s for the exemplary embodiment, the period T of the clock signal 4 is 820 ps.

The receiver 1 further comprises a level detection device 5 whose input signals are the bit-stream and the clocks signals 4, 21. The level detection device 5 samples the bit-stream signal 21 utilizing the clock signal 4 and compares each sampled signal with levels in order to decode the digital information of the bit-stream signal 21. If the sampled signal is less than the relevant level, then it is decided that the corresponding hard-bit value is "0", otherwise, it is it is decided that the corresponding hard-bit value is "1"

In general, the level detection device 5 is configured to sample the bit-stream signal 21 for each bit at at least two different sampling points within the eye pattern 20. This means, that the level detection device 5 may sample the bit-stream signal 21 at two or more points in time within the relevant eye-pattern 20 and/or compares the sampled signal value with different levels.

Figure 3:
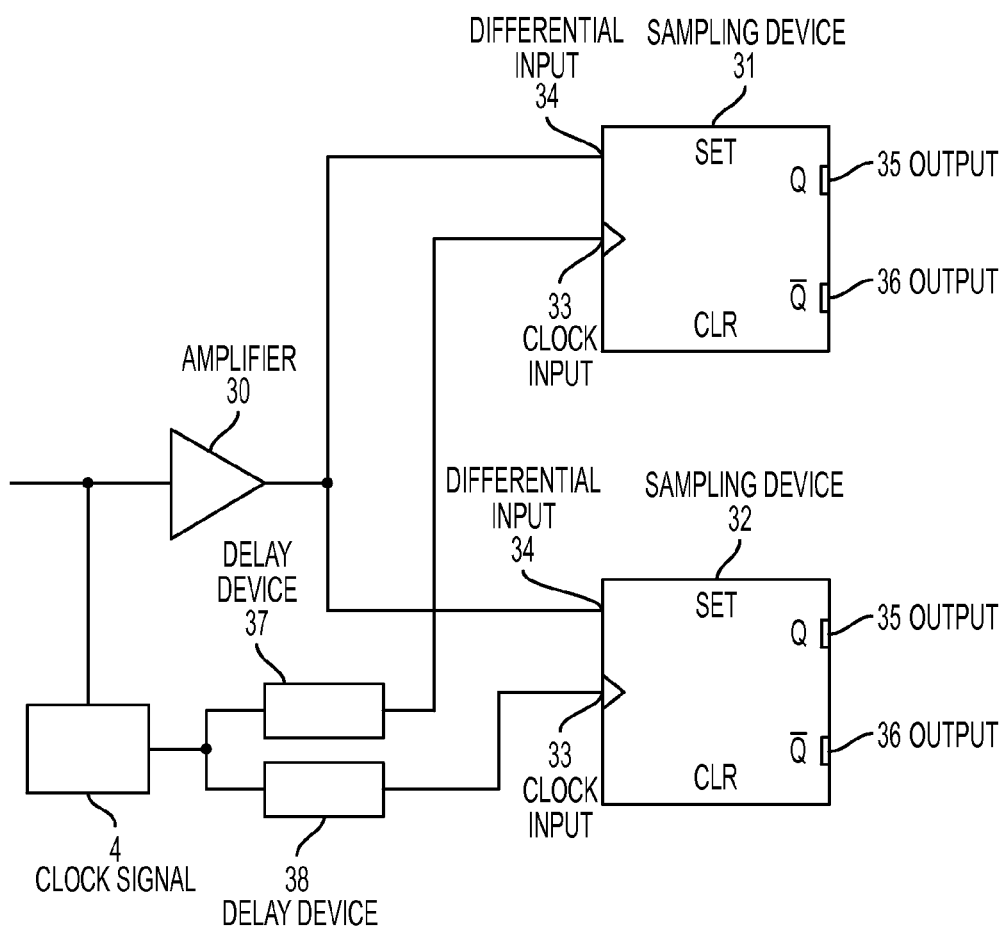
FIG. 3 is a block diagram of a level detection device.
Figure 4:
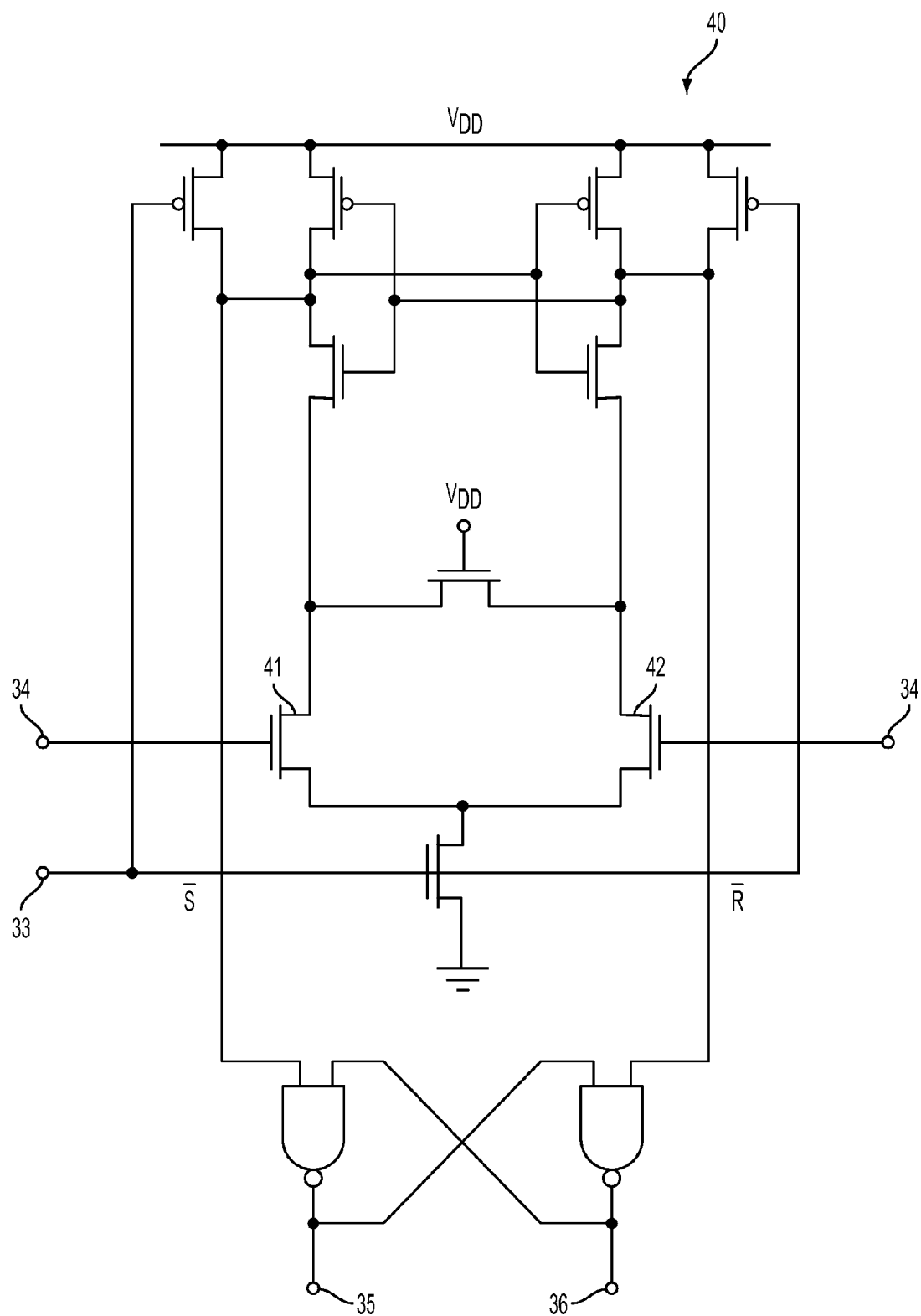
FIG. 4 is a circuit diagram of a flip-flop.
Figure 5:
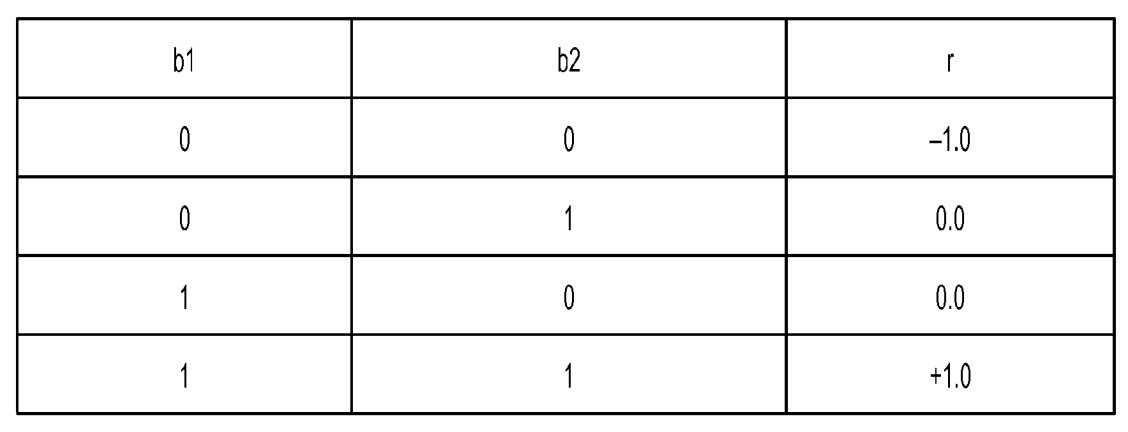

FIGS. 3 to 5 illustrate a first exemplary embodiment, wherein the level detection device 5 samples the bit-stream signal 21 for each bit at two different sampling points within a corresponding eye pattern 20 shown in FIG. 2. Since the bit rate of the bit-stream signal 21 is 1.22 Gbit/s for the exemplary embodiment, a bit is received every 820 ps. Assuming the beginning of receiving a bit is at t=0.0 s then the bit-stream signal 21 is sampled for this bit at $t=t_1$ and at $t=t_2$, wherein 0<t<820 ps.

For the exemplary embodiment, the time axis of the eye-pattern 20 is normalized so that the vertical scale "1.0" corresponds to 820 ps and $t_1$=0.4 and $t_2$=0.6. In addition, the level with which the sampled signals are compared equals 0V.

FIG. 3 shows an example of an implementation of the level detection device 5 for the first exemplary embodiment. For this example, the level detector 5 is comprised of an amplifier 30 and first and second sampling devices 31, 32. The sampling devices 31, 32 may be D-type flip-flops as disclosed, for instance, by B. Nikolic et. al. in "Improved Sense-Amplifier-Based Flip-lop", IEEE Journal of Solid State Circuits, Vol. 35, 2000, pp. 876-884. FIG. 4 shows a circuit diagram of a suitable flip-flop 40.

Each flip-flop 31, 32 comprises a clock input 33 and a differential input 34, and first and second outputs 35, 36.

The flip-flops 31, 32 are configured to sample the data-stream signal 21, which may be amplified by a differential amplifier 30 as shown in FIG. 3, if a rising edge of a clock signal appears at the relevant clock input 33 of the first and second flip-flops 31, 32.

The first flip-flop 31 samples the bit-stream signal 21 at a first sampling time $t_1$=0.4 utilizing a first clock signal and the second flip-flop 32 samples the bit-stream signal 21 at a second sampling time $t_1$=0.6 utilizing a second clock signal. The first and second clock signals are generated by appropriately delaying the clock signal 4 generated by the clock recovery device 3 utilizing delay devices 37, 38.

The flip-flops 31, 32 are further configured to internally compare each sampled signal with a pre-defined level which is 0V for both flip-flops 31, 32 for the first exemplary embodiment. If the sampled signal is less than 0V, then the state of the relevant flip-flop 31, 32 is logical "0", otherwise the state is logical "1". The logical states are present at outputs 35 and the inverse of the states are present at outputs 46. The states of the flip-flops 31, 32 are fed to a device 6 for further processing.

FIG. 5 shows a table which summarizes the possible states of the flip-flops 31, 32. The state of the first flip-flop 31 is denoted by b1 and the state of the second flip-flop 32 is denoted by b2. The table of FIG. 5 further includes a soft-bit value r which is calculated as the average of the states b1, b2. Thus, if both flip-flops 31, 32 determine that the data-stream signal 21 has the state "0" for a certain received bit, then the soft-bit value r equals −1.0, if both flip-flops 31, 32 determine that the data-stream signal 21 has the state "1" for a certain received bit, then the soft-bit value r equals +1.0, and if one of the flip-flops 31, 32 determines that the data-stream signal 21 has the state "0" and the other flip-flop 31, 32 determines that the data-stream signal 21 has the state "1" for a certain received bit, then the soft-bit value r equals 0.0.

In order to determine the bit-values for the received bits, the soft-bit values r of a received 10-bit symbol are subjected to a so-called soft-decision algorithm which is executed by the device 6. Soft-decision algorithms per se are know. Suitable soft-decisions algorithms are, for instance, the so-called CHASE algorithm, especially the CHASE-3 algorithm as disclose, for example, in T. K. Moon, "Error correction coding", Wiley, 2005, pg. 445. For the soft-decision decoding, soft-bits values r of the 10-bit symbol which deviate the most from a hard-bit value "0" or "1" are set to the status "undefined".

The bit values calculated by the device 6 are outputted at an output 7 of the receiver 1.

Figure 6:
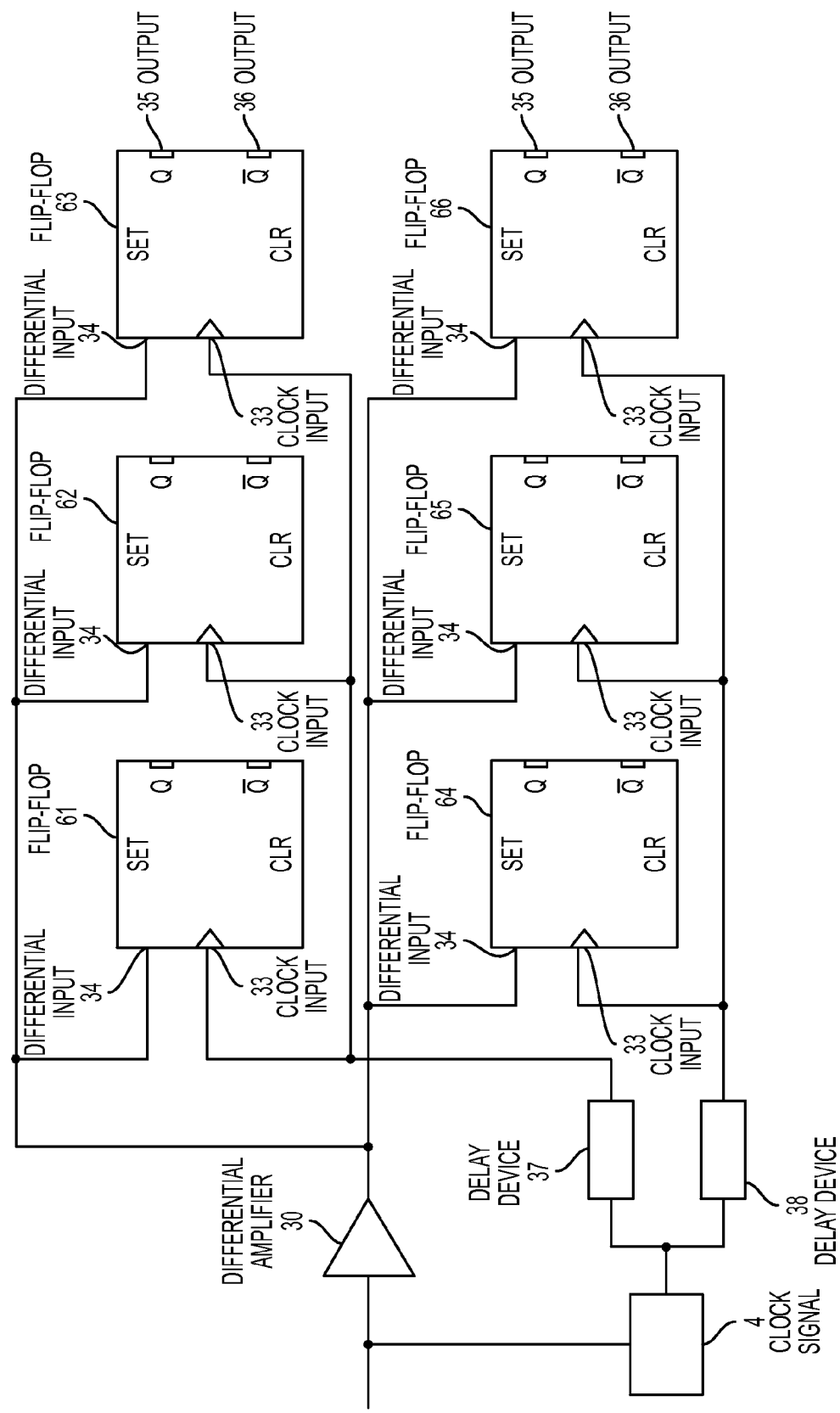

FIGS. 6 and 7 illustrate a second exemplary embodiment for a level detection device 5. For the second exemplary embodiment, the bit-stream signal 21 for an individual bit is sampled at six different sample points within the eye pattern 20. For this example, the bit-stream signal 21 is sampled at two different points in time, $t_1$ and $t_2$, and is compared with three different levels, namely $V_{t1} = -100$ mV, $V_{t2} = 0$V, and $V_{t3} = +100$ mV.

For the second exemplary embodiment, the sampling and comparing with the relevant level is carried out by six sampling devices which may be six D-type flip-flops 61-66 as shown in FIG. 6.

The flip-flops 61-63 are clocked by the first clock signal which is generated by the delay device 37 by appropriately delaying the clock signal 4 generated by the clock recovery device 3 such that the flip-flops 61-63 sample the bit-stream signal 21 at the first sampling time $t_1$.

The first flip-flop 61 is further configured to compare the sampled data stream signal with the first level $V_{t1}$. Thus, if the sampled signal is less than −100 mV, then the state of the first flip-flop 61 is logical "0", otherwise it is logical "1".

The second flip-flop 62 is further configured to compare the sampled data stream signal with the second level $V_{t2}$. Thus, if the sampled signal is less than 0V, then the state of the second flip-flop 62 is logical "0", otherwise it is logical "1".

The third flip-flop 63 is further configured to compare the sampled data stream signal with the third level $V_{t3}$. Thus, if the sampled signal is less than +100 mV, then the state of the third flip-flop 63 is logical "0", otherwise it is logical "1".

The flip-flops 64-66 are clocked by the second clock signal which is generated by the delay device 38 by appropriately delaying the clock signal 4 generated by the clock recovery device 3 such that the flip-flops 64-66 sample the data-stream signal 21 at the second sampling time $t_2$.

The fourth flip-flop 64 is further configured to compare the sampled data stream signal with the first level $V_{t1}$. Thus, if the sampled signal is less than −100 mV, then the state of the fourth flip-flop 64 is logical "0", otherwise it is logical "1".

The fifth flip-flop 65 is further configured to compare the sampled data stream signal with the second level $V_{t2}$. Thus, if the sampled signal is less than 0V, then the state of the fifth flip-flop 65 is logical "0", otherwise it is logical "1".

The sixth flip-flop 66 is further configured to compare the sampled data stream signal with the third level $V_{t1}$. Thus, if the sampled signal is less than +100 mV, then the output of the sixth flip-flop 63 is logical "0", otherwise it is logical "1".

The states of the flip-flops 61-66 are fed to the device 6 for further processing.

If the flip-flops 61-66 are realized according to the flip-flop 40 of FIG. 4, then the comparing of the sampled data-stream signal with the different levels can be achieved by appropriately choosing the properties of Mosfets 41, 42 of the flip-flop 40 of FIG. 4.

FIG. 7 shows a table which summarizes the possible states of the flip-flops 61-66. The state of the first flip-flop 61 is denoted by S1, the state of the second flip-flop 62 is denoted by S2, the state of the third flip-flop 63 is denoted by S3, the state of the fourth flip-flop 64 is denoted by S4, the state of the fifth flip-flop 65 is denoted by S5, and the state of the sixth flip-flop 66 is denoted by S6. The table of FIG. 7 further includes a soft-bit value r which is stored in the device 6. For the exemplary embodiment, the soft-bit value r has values between −1.0 and +1.0.

In order to determine the bit-values of the bits within the received bit-stream signal 21, the soft-bit values r of a received 10-bit symbol is subjected to a so-called soft-decision algorithm which is executed by the device 6.

For the second exemplary embodiment, the CHASE-3 soft-decision algorithm as described in T. K. Moon, "Error correction coding", Wiley, 2005, pg. 445 is adapted.

Firstly, a reliability number z of a received bit is defined as the absolute value of the corresponding soft-bit value r.

$$z = |r|$$

A received 10-bit symbol has therefore the following sequence of soft-bits:

$$r = (r_0, r_1, r_2, r_3, r_4, r_5, r_6, r_7, r_8, r_9)$$

wherein $r_i$ is the i-th bit of the received 10-bit symbol.

Then, the corresponding reliability number $z_i$ of the i-th bit of the received 10-bit symbol is $$zi = |ri|.$$

Without error correction, a hard decision bit sequence $$v = (v_0, v_1, v_2, v_3, v_4, v_5, v_6, v_7, v_8, v_9)$$

can be obtained according to $$v_i = \begin{cases} 0; & \text{for } r_i < 0; \\ 1; & \text{for } r_i \geq 0; \end{cases}$$

When applying the CHASE-3 soft-decision algorithm for decoding an 8B/10B bit-stream, it reads as following:

Identifying in each received 10 bit-entity, the position of a soft-bit value ri having the lowest reliability value zi;

obtaining the hard decision bit sequence $v = (v_0, v_1, v_2, v_3, v_4, v_5, v_6, v_7, v_8, v_9)$ of the relevant 10 bit entity;

inverting the hard-bit value $v_i$ having the lowest reliability in order to obtain a modified hard decision bit sequence $$v^* = (v_0, \ldots \text{NOT}(v_i), \ldots v_9)$$

decoding both, the 10 bit hard decision bit sequence v and the modified hard decision bit sequence v*;

if the result of only one of the two decodings leads to a coding error, then discard the relevant hard decision bit sequence;

if the result of both decodings lead to correct coding words, then save both results and continue in two branches with the decoding of the subsequent received 10 bit symbol;

after a depth of L 10 bit entities, for instance L=4, take the branch with the best overall reliability and discard the results of the other branches.

It can be shown that in the case of a 8B/10B coding scheme, the CHASE-3 algorithm can correct only a single bit error in each received 10 bit symbol, while a two bit error (double error) or more than two bit errors in one received 10 bit symbol word cannot be corrected. If the branch depth L is not large enough, then there remains a small number of special sequences which might lead to not correctable errors. These are described in the IEEE Standard 802.3-2002, chapter 36.2.4 "8B/10B transmission code", table 36B 1 and 2, as running disparity errors not detected in an erroneous received 10 bit symbol itself, but rather in a code group following the error. For instance, if a code sequence D21.2-D10.2-D23.5 is transmitted with a special bit error in a certain 10 bit-entity (1010101011 instead of 1010101001), then the error would be visible as a code error only two received 10 bit symbol later. Therefore, if the branch depth L is less than three, then this error cannot be corrected.

For the exemplary embodiments described above, the point in times t1, t2 at which the bit-stream signal 21 is sampled and the levels Vt1, Vt2, Vt3 with which the sampled signals are compared are fixed.

It is also possible to adapt the sampling times t1, t2 and/or the levels Vt1, Vt2, Vt3 during time. For example, it is possible to determine the vertical eye opening $\Delta V$ and/or the width $\Delta t$ of the eye pattern 20. Then, the sampling times t1, t2 can, for instance, be initially found as t0±0.1 $\Delta t$, wherein t0 is a reference sampling time, for instance, in the middle of the eye pattern 20.

While the bit-stream signal 21 is received, the sampling times t1, t2 may adapted in accordance to the integrity of the bit-stream signal 21.

Alternatively or additionally, the levels Vt1, Vt2, Vt3 may initially set, for instance, to levels Vt1=0V−0.25 $\Delta V$, Vt2=0V, and Vt3=0V+0.25 $\Delta V$. While receiving the bit-stream signal 21, the levels Vt1, Vt2, Vt3 can be adapted, for instance, in accordance to the integrity of the bit-stream signal 21.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for decoding digital information, comprising:
   receiving, at a digital receiver utilizing wired communication, a bit-stream signal containing binary information, the bit-stream signal being encoded utilizing a Maximum Run Length Coding scheme combined with a DC-balanced block coding scheme, and the combined coding scheme is an 8B/10B coding scheme;
   sampling, after said receiving, the bit-stream signal for each binary value at least two different sampling points within an eye pattern associated with the binary value to obtain a hard-bit value for each sampling point;
   generating a single soft-bit value for each binary value based on the hard-bit value of the binary value; and
   determining a bit value of the binary value by subjecting soft-bit values to a soft-decision algorithm that generates a reliability number for each binary number based on the generated soft-bit values, the reliability number being an absolute value of a corresponding soft-bit value,
   wherein the at least two different sampling points within the eye pattern are realized by sampling the received bit-stream signal at a single point in time within the eye pattern in order to obtain a sampled bit-stream signal and comparing the sampled bit-stream signal with two different levels, and
   wherein DC balancing is accomplished by selecting only 10B symbols as allowed code words that have two or more logical "0" values than logical "1" values.

2. The method as recited in claim 1, wherein the two different sampling points within the eye pattern are selected by one of
   sampling the bit-stream signal at two different points in time within the eye pattern to obtain sampled bit-stream signals and comparing the sampled bit-stream signals with a predetermined level; and sampling the bit-stream signal at two different points in time within the eye pattern to obtain the sampled bit-stream signals and comparing the sampled bit-stream signals with two different levels.

3. The method as recited in claim 1, wherein the soft-decision algorithm includes error correction ability.

4. The method as recited in claim 1, wherein the soft-decision algorithm is one of a CHASE-1, a CHASE-2 and a CHASE-3 soft-decision algorithm.

5. The method as recited in claim 1, wherein the bit-stream signal includes sequentially received blocks of a plurality of binary values, and the method comprising:
   generating soft-bit sequences for each block, the soft-bit sequences including a sequence of the soft-bit values associated with the binary values of the block, and
   determining the bit value of the binary value by subjecting the soft-bit sequences to the soft-decision algorithm.

6. The method as recited in claim 5, comprising
   varying the different sampling points within the eye pattern while receiving the bit-stream signal.

7. The method as recited in claim 6, comprising:
   determining a vertical opening of the eye pattern; and
   determining the sampling points within the eye pattern for the sampling of the bit-stream signal by adjusting a level with which a sampled bit-stream signal is compared, in accordance with the vertical opening of the eye pattern.

8. The method as recited in claim 7, comprising
   recovering from the bit-stream signal a clock signal for sampling the bit-stream signal.

9. A digital receiver for decoding digital information, comprising:
   a clock recover device generating a clock signal utilizing a bit-stream signal which is received by the digital receiver utilizing wired communication and which contains binary information, the bit-stream signal being encoded utilizing a Maximum Run Length Coding scheme combined with a DC-balanced block-coding scheme and the combined scheme is an 8B/10B coding scheme;

a level detection device sampling the received bit-stream signal for each binary value at least two different sampling points within an eye pattern associated with the binary value utilizing at least indirectly the clock signal to obtain a hard-bit value for each sampling point; and a calculation device generating a single soft-bit value for each binary value based on the hard-bit values of the binary value and determining the bit value of the binary value by subjecting soft-bit values to a soft-decision algorithm that generates a reliability number for each binary number based on the generated soft-bit values, the reliability number being an absolute value of a corresponding soft-bit value, wherein the at least two different sampling points within the eye pattern are realized by sampling the received bit-stream signal at a single point in time within the eye pattern in order to obtain a sampled bit-stream signal and comparing the sampled bit-stream signal with two different levels, and wherein DC balancing is accomplished by selecting only 10B symbols as allowed code words that have two or more logical "0" values than logical "1" values.

10. The receiver as recited in claim 9, wherein the level detection device determines the two different sampling points within the eye pattern by one of sampling the bit-stream signal at two different points in time within the eye pattern to obtain sampled bit-stream signals and comparing the sampled bit-stream signals with a predetermined level, and sampling the bit-stream signal at two different points in time within the eye pattern to obtain the sampled bit-stream signals and comparing the sampled bit-stream signals with two different levels.

11. The receiver as recited in claim 9, wherein the level detection device comprises a plurality of sampling devices, each generating one of the hard-bit values related to each binary value by sampling the bit-stream signal at a relevant point in time and comparing the sampled bit-stream signal with a relevant level.

12. The receiver as recited in claim 9, wherein the soft-decision algorithm includes error correction ability.

13. The receiver as recited in claim 9, wherein the soft-decision algorithm is a CHASE-1, CHASE-2 or a CHASE-3 soft-decision algorithm.

14. The receiver as recited in claim 9, wherein the bit-stream includes sequentially received blocks of a plurality of binary values and wherein the calculation device further generates soft-bit sequences for each block, the soft-bit sequences including a sequence of the soft-bit values associated with the binary values of a relevant block, and determines the bit value of the binary value by subjecting the soft-bit sequences to the soft-decision algorithm.

15. The receiver as recited in claim 14, wherein the level detection device varies the different sampling points within the eye pattern while receiving the bit-stream signal.

16. The receiver as recited in claim 15, wherein the level detection device determines a vertical opening of the eye pattern and determines the points within the eye pattern for the sampling of the bit-stream signal by adjusting a level, with which a sampled bit-stream signal is compared, in accordance with the vertical opening of the eye pattern.

\* \* \* \* \*